(12) United States Patent
Wang (10) Patent No.: US 10,983,700 B2
(45) Date of Patent: *Apr. 20, 2021

(54) BUFFERING DEVICE WITH STATUS COMMUNICATION METHOD FOR MEMORY CONTROLLER

(71) Applicant: Rambus Inc., Sunnyvale, CA (US)

(72) Inventor: David Wang, Westlake Village, CA (US)

(73) Assignee: Rambus, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,130

(22) Filed: Mar. 26, 2020

(65) Prior Publication Data
US 2020/0293190 A1    Sep. 17, 2020

Related U.S. Application Data (63) Continuation of application No. 16/266,216, filed on Feb. 4, 2019, now Pat. No. 10,606,483, which is a continuation of application No. 14/885,031, filed on Oct. 16, 2015, now Pat. No. 10,198,187.

(51) Int. Cl.
*G06F 3/06* (2006.01)
*G06F 13/16* (2006.01)
*G06F 13/00* (2006.01)

(52) U.S. Cl.
CPC ............ *G06F 3/061* (2013.01); *G06F 3/0656* (2013.01); *G06F 3/0659* (2013.01); *G06F 3/0683* (2013.01); *G06F 13/00* (2013.01); *G06F 13/1689* (2013.01)

(58) Field of Classification Search
CPC ...... G06F 3/061; G06F 3/0656; G06F 3/0659; G06F 3/0683; G06F 13/00; G06F 13/1689

See application file for complete search history.

(56) References Cited

U.S. PATENT DOCUMENTS

| | | | |
|---|---|---|---|
| 7,724,589 B2 | 5/2010 | Rajan et al. |
| 7,730,338 B2 | 6/2010 | Rajan et al. |
| 7,761,724 B2 | 7/2010 | Rajan et al. |
| 8,019,589 B2 | 9/2011 | Rajan et al. |
| 8,041,881 B2 | 10/2011 | Rajan et al. |
| 8,077,535 B2 | 12/2011 | Schakel et al. |
| 8,080,874 B1 | 12/2011 | Werner et al. |
| 8,089,795 B2 | 1/2012 | Rajan et al. |
| 8,090,897 B2 | 1/2012 | Rajan et al. |
| 8,112,266 B2 | 2/2012 | Rajan et al. |
| 8,122,207 B2 | 2/2012 | Rajan et al. |
| 8,154,935 B2 | 4/2012 | Rajan et al. |
| 8,169,233 B2 | 5/2012 | Ferolito et al. |
| 8,181,048 B2 | 5/2012 | Rajan et al. |
| 8,209,479 B2 | 6/2012 | Rajan et al. |
| 8,233,304 B2 | 7/2012 | Xu |
| 8,244,971 B2 | 8/2012 | Rajan et al. |

(Continued)

*Primary Examiner* — Eric Cardwell
(74) *Attorney, Agent, or Firm* — Lowenstein Sandler LLP (57) ABSTRACT

In an example, the present invention provides a memory interface device. The device has a command interface, address interface, and a control interface device coupled, respectively, to a command address bus, an address bus, and a control interface bus of a host memory controller. The device has a status signal interface configured to output a status signal coupled to the data interface bus of the host memory controller. In an example, the status signal is asserted in an absence of data asserted on the data interface bus.

20 Claims, 5 Drawing Sheets

(56) References Cited

U.S. PATENT DOCUMENTS

| | | |
|---|---|---|
| 8,275,936 B1 | 9/2012 | Haywood et al. |
| 8,280,714 B2 | 10/2012 | Rajan et al. |
| 8,316,175 B2 | 11/2012 | Ho |
| 8,327,104 B2 | 12/2012 | Smith et al. |
| 8,335,894 B1 | 12/2012 | Rajan et al. |
| 8,340,953 B2 | 12/2012 | Rajan et al. |
| 8,359,187 B2 | 1/2013 | Rajan et al. |
| 8,386,722 B1 | 2/2013 | Wang et al. |
| 8,407,412 B2 | 3/2013 | Rajan et al. |
| 8,438,328 B2 | 5/2013 | Smith et al. |
| 8,566,516 B2 | 10/2013 | Schakel et al. |
| 8,566,556 B2 | 10/2013 | Rajan et al. |
| 8,595,419 B2 | 11/2013 | Rajan et al. |
| 8,601,204 B2 | 12/2013 | Rajan et al. |
| 8,619,452 B2 | 12/2013 | Rajan et al. |
| 8,631,193 B2 | 1/2014 | Smith et al. |
| 8,631,220 B2 | 1/2014 | Smith et al. |
| 8,667,312 B2 | 3/2014 | Rajan et al. |
| 8,671,244 B2 | 3/2014 | Rajan et al. |
| 2011/0055490 A1 | 3/2011 | Gentric et al. |

BUFFERING DEVICE WITH STATUS COMMUNICATION METHOD FOR MEMORY CONTROLLER

RELATED APPLICATION

This application is a continuation of U.S. patent application Ser. No. 16/266,216, filed Feb. 4, 2019, now U.S. Pat. No. 10,606,483, issued Mar. 31, 2020, which is a continuation of U.S. patent application Ser. No. 14/885,031, filed Oct. 16, 2015, now U.S. Pat. No. 10,198,187, issued Feb. 5, 2019, which is hereby incorporated in its entirety herein by reference.

BACKGROUND OF THE INVENTION

The present invention relates to memory storage systems and devices.

This invention relates generally to memory systems, and more particularly to memory systems which include a memory buffer that serves as an interface between a host controller and memory devices or other memory buffering devices residing on a DIMM, the memory buffer being optionally located on the DIMM itself or as part of the motherboard on which the DIMM connectors are also located.

Traditional computer systems, such as servers, workstations, desktops and laptops, all use pluggable memory which can be inserted into slots on the computer's motherboard as needed. The most common form of pluggable memory is the Dual In-line Memory Module (DIMM). Historically, DIMMs contain multiple RAM chips—typically DRAM—each of which has a data bus width of 4 or 8 bits. Typically, eight or nine 8-bit DRAM chips (or twice as many 4-bit DRAM chips) are arranged in parallel to provide each DIMM with a total data bus width of 64 or 72 bits; the data bus, typically referred to as the 'DQ' bus, is connected to a host controller. Each arrangement of 64 or 72 data bits using DRAM chips in parallel is termed a 'rank'.

A command/address (CA) bus also runs between the host memory controller and each DIMM; the CA and DQ busses together form a 'system' bus. With a basic unbuffered DIMM, the CA bus is connected to every DRAM on the DIMM. As a result, there is a high electrical load on the CA bus, given by the product of the number of DRAMs times the number of ranks. For the DQ bus, the number of electrical loads is equal to the number of ranks.

A buffering device is employed to reduce loading in a 'load reduction' DIMM (LR-DIMM). An LR-DIMM containing multiple DRAM chips uses a logic device to buffer the DQ and CA signals between the DRAMs and a host controller. The logic device may be, for example, a single device such as the iMB (isolating Memory Buffer) from Inphi Corporation. Memory systems of this sort are described, for example, in co-pending U.S. patent application Ser. Nos. 12/267,355 and 12/563,308, which are incorporated herein by reference, for all purposes. Further details of conventional techniques can be found in U.S. Pat. No. 8,966,327, commonly assigned, in the name of Dr. David Wang, which issued Feb. 24, 2015, and hereby incorporated by reference for all purposes.

SUMMARY OF INVENTION

In an example, the present invention provides a method of operating a memory interface device. The method includes initializing a command interface, address interface, and a control interface device coupled, respectively, to a command address bus, an address bus, and a control interface bus of a host memory controller. The method includes initializing a data interface coupled to a data interface bus of host memory controller, at least one of the command interface, the address interface, or the control interface coupled to a memory device of a first type. In an example, the memory device of a first time is selected from a dynamic random access memory or another type of memory device. The method includes initializing a status signal interface configured to output a status signal coupled to the data interface bus of the host memory controller. The method includes transferring the status signal from the memory interface circuit to the host memory controller when data to be asserted on the data interface bus is absent such that a status word is transferred on the data interface bus. The method includes initializing a protocol checking and status generator block ("Block"), the protocol checking block comprising a protocol circuit and a status generating circuit configure with the protocol circuit. The method includes initializing a table configured the Block, the table being programmable with a plurality of timing parameters. In an example, the plurality of timing parameters with at least one or two of DRAM timing parameters includes tCL, tRCD, tRP, tWR, tAL, tRFC, tRRD, tCCD, tRAS, or tCWL, among others. In an example, the method includes transferring data from the memory through the data interface bus, the data interface bus being free from an assertion of the status signal and performing the transferring data within a time period of tCL, the t CL being 20 nanoseconds and less, and greater than 5 nanoseconds. Of course, there can be other variations, modifications, and alternatives.

In an example, the present invention provides a memory interface device. The device has a command interface, address interface, and a control interface device coupled, respectively, to a command address bus, an address bus, and an control interface bus of a host memory controller. The device has a data interface coupled to a data interface bus of host memory controller and at least one of the command interface, the address interface, or the control interface coupled to a memory device of a first type. In an example, the memory device of a first time is selected from a dynamic random access memory or another type of memory device. The device has a status signal interface configured to output a status signal coupled to the data interface bus of the host memory controller. In an example, the status signal is asserted in an absence of data asserted on the data interface bus. The device has a protocol checking and status generator block ("Block"), the protocol checking block comprising a protocol circuit and a status generating circuit configure with the protocol circuit. The device has a table configured the Block. In an example, the table is programmable with a plurality of timing parameters, the plurality of timing parameters with at least one or two of DRAM timing parameters including tCL, tRCD, tRP, tWR, tAL, tRFC, tRRD, tCCD, tRAS, or tCWL. In an example, programming can occur using software, firmware, or hardware for the registers or control registers during system initialization.

In an example, the method includes transferring information to and from the buffer device from the host computer or the plurality of memory devices and processing the information from either or both a command bus or/and an address bus to identify an erroneous command or erroneous address bus information. The method includes blocking the erroneous command or erroneous address bus information. The method also includes transferring instructions to preserve or return the plurality of memory devices to a known state. The method also processing protocol information for selected or all commands that pass through the Block.

These and other features, aspects, and advantages of the present invention will become better understood with reference to the following description and claims.

DETAILED DESCRIPTION OF THE SPECIFIC EXAMPLES

As background, we briefly explain certain inadequacies of fixed latency, deterministically scheduled Memory Systems, as further described throughout the present specification and more particularly below.

Figure 1:
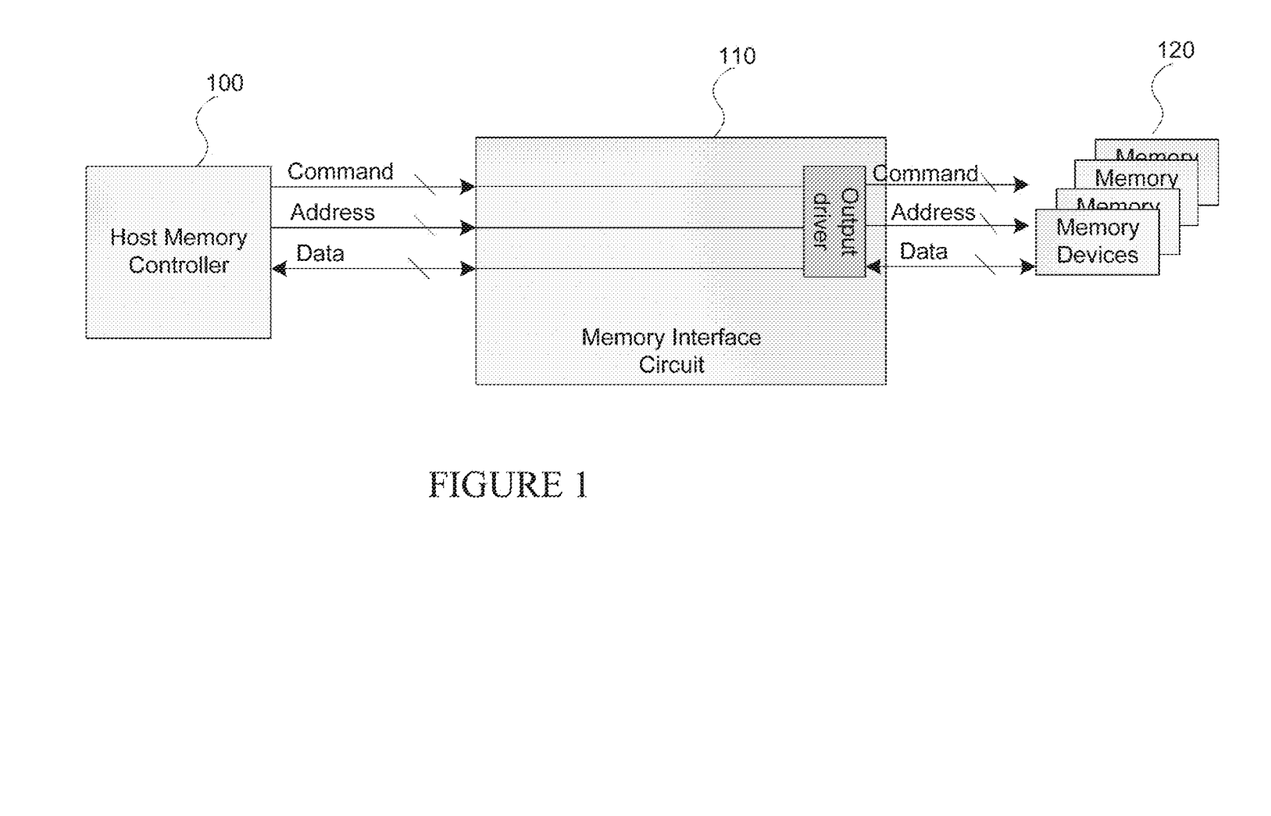
FIG. 1 is a simplified illustration of a memory system.

FIG. 1 illustrates a baseline memory system that consists of a host memory controller, 100, a memory interface circuit 110, and multiple memory devices 120. One example of the memory interface circuit 110 illustrated in FIG. 1 is a DDR3 Memory Buffer. The description of the memory interface circuit 110 is generic in nature, and many other circuits may be broadly categorized as a memory interface circuit. In the baseline memory system illustrated in FIG. 1, the host controller 100 issues commands to the memory interface circuit 110, and the memory interface circuit buffers and re-drives the command to the memory devices. In the case that the command is a read command, the memory devices 120 are typically programmed to return data with a fixed, pre-determined latency. The Memory Interface Circuit 110 then buffers and re-drives the data to the host memory controller 100. In the case that the command is a write command, the host memory controller 100 drives the data also with a fixed, pre-determined latency relative to the write command, and the Memory Interface Circuit 110 re-drives the command and the data to the memory devices 120 with the fixed, pre-determined latency value that the memory devices had been programmed with.

One issue with the baseline memory system illustrated in FIG. 1 is that the memory system cannot easily deal with new, emerging memory devices that may need longer latencies on some commands some of the time. That is, for the majority of time, the memory device may operate with a fixed, pre-determined latency value, but once in a while, the memory device may find itself unable to meet the timing requirement imposed by the pre-programmed latency value for some sub set of the commands.

One possible solution to the issue of a memory device that may occasionally need more time to respond to a command is to simply select the absolute worst case latency value that the device may incur and operate the memory device with that absolute worst case latency. However, this solution may severely constrain performance and likely to be unacceptable as a general solution.

A second possible solution to the issue of a memory device that may occasionally need more time to respond to a command is to incorporate a feedback signal that stalls the host memory controller in the case that the memory device requires more time. However, the feedback signal in the context of modern high performance memory controllers is difficult to implement owing to the fact that the stall signal would stall all further commands, thus impacting performance even for commands that are unrelated to the command that caused the stall.

In this work, a third solution is proposed that utilizes a status signal that, when activated, informs the host memory controller that a given command may require more time to complete, and utilizes the shared data bus to return a status word that may optionally include: reason for the stall, and recommended re-try time for the host memory controller to re-issue the command to the memory interface device.

Figure 2:
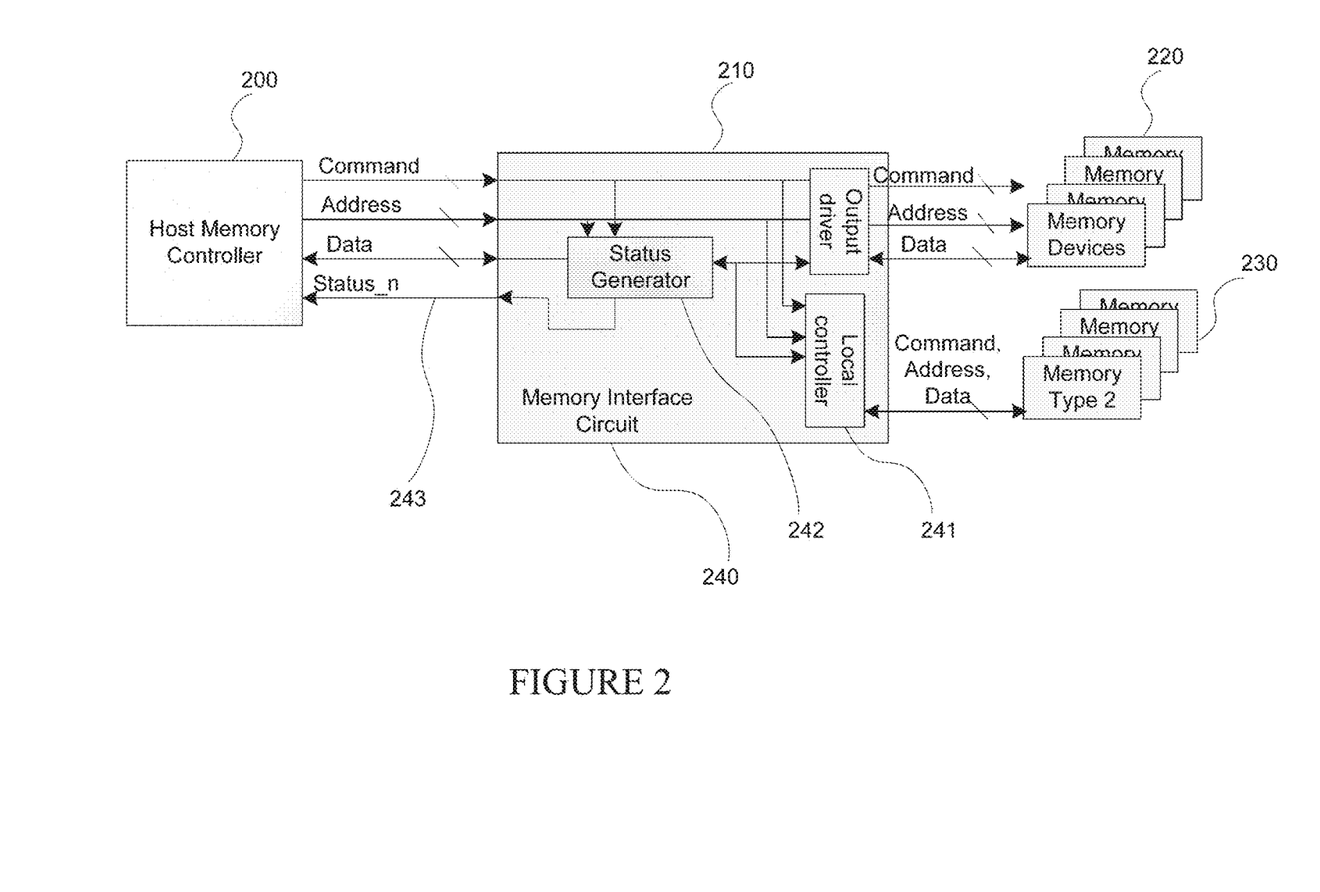
FIG. 2 is a simplified illustration of a memory system according to an example of the present invention.

FIG. 2 illustrates a memory system that is structurally similar to the baseline memory system illustrated in FIG. 1. The difference between FIG. 1 and FIG. 2 is that the Memory interface circuit 240 in FIG. 2 includes a circuit, labelled as Status Generator 242, which can report the status of commands to the host memory controller. The proposed status reporting mechanism is enabled through the inclusion of an additional signal Status_n 243. The usage model of the Status_n 243 signal is as follows: under normal operating conditions, the Status_n 243 signal is de-asserted, and the memory interface circuit returns data with a fixed, pre-determined latency value through the data bus as is customary. However, in the case that the memory interface circuit is unable to return data with the fixed, pre-determined latency value, the Status Generator circuit 242 asserts the Status_n signal 243, and returns a status symbol to the host memory controller through the data bus, utilizing the timing of the fixed, pre-determined latency that the host memory controller expects for the read command.

Moreover, the Interface Circuit 240 is coupled with not only the fixed-latency memory devices 220, but also be coupled with new memory devices 230 that may require variable latency for some commands.

Figure 3:
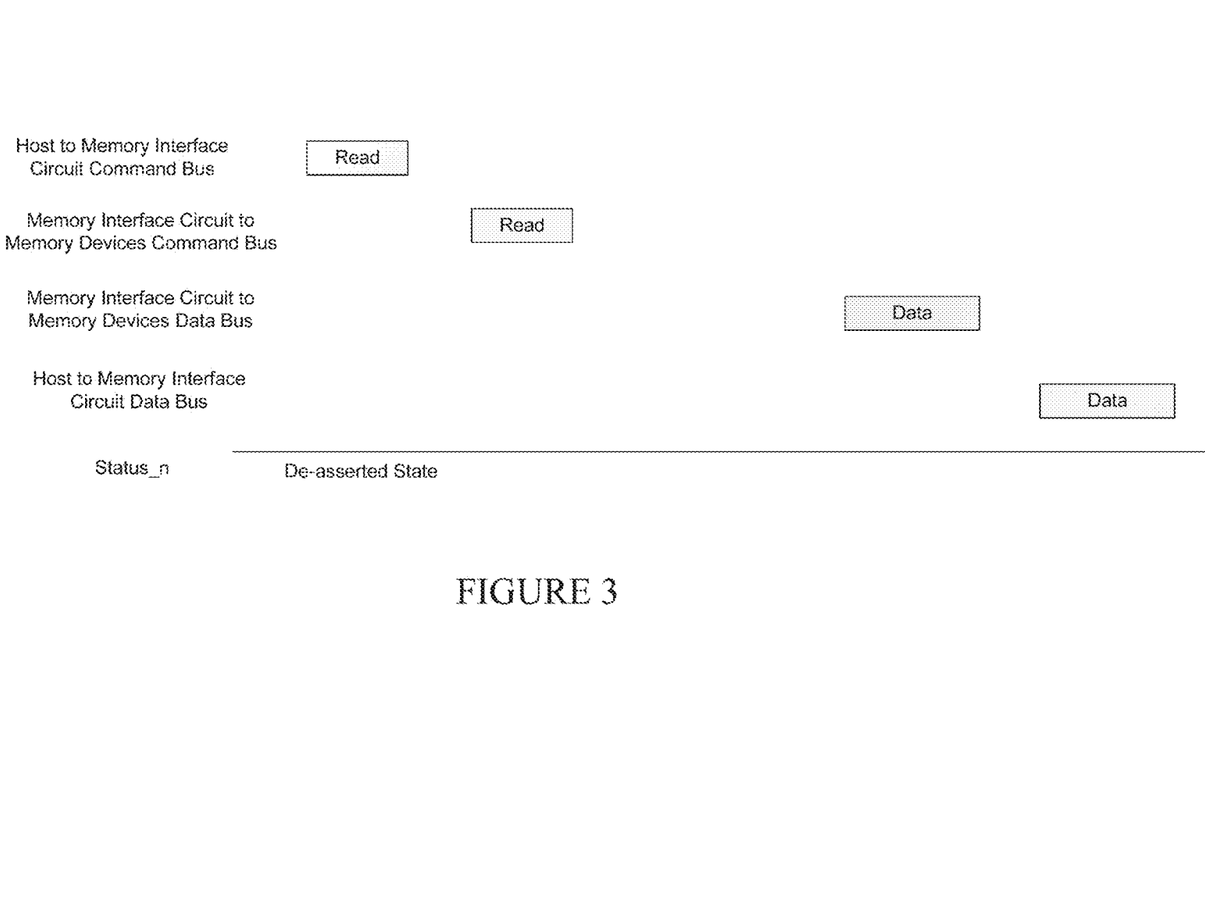
FIG. 3 is a simplified illustration of timing of normal read command through a memory system.

FIG. 3 illustrates the timing of an ordinary read command with fixed, pre-determined latency through a memory interface circuit.

Figure 4:
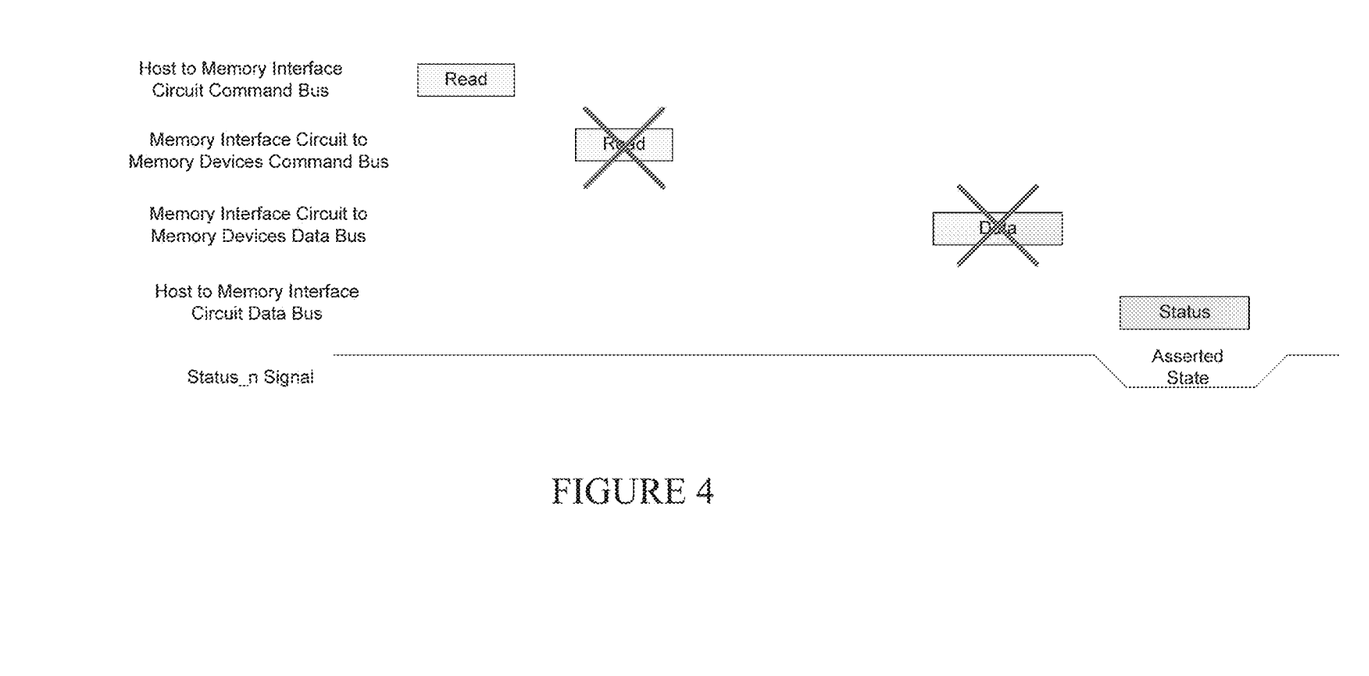
FIG. 4 is a simplified illustration of a timing of a read command using a status signal in a memory system according to an example of the present invention.

FIG. 4 illustrates the timing of a read command where the memory interface device is unable to return data with fixed, pre-determined latency to the host memory controller, and instead asserts the Status_n signal and returns a status word to the host memory controller in lieu of data.

Figure 5:
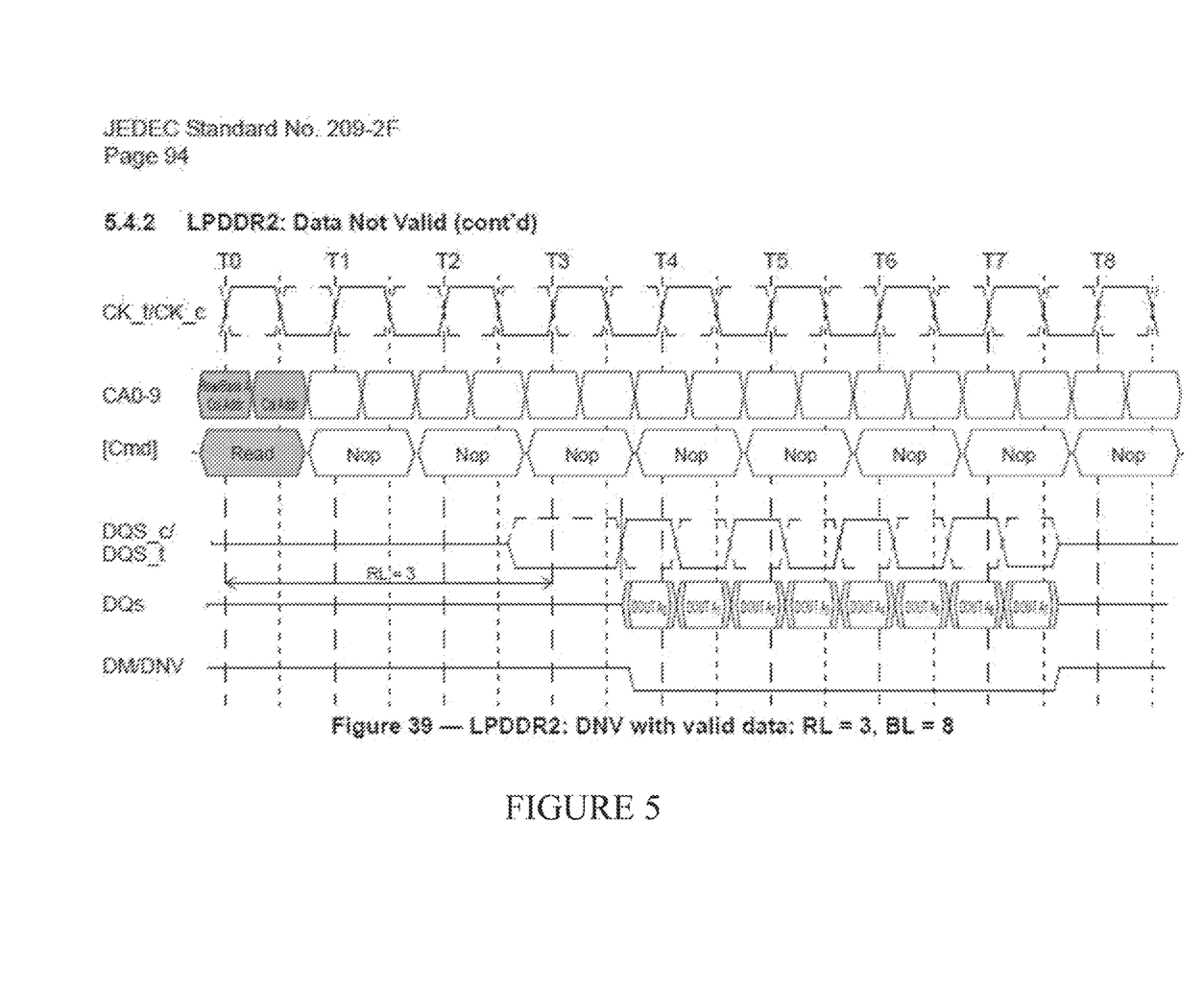
FIG. 5 is timing diagram of a LPDDR2 device for a data not valid signal.

FIG. 5 illustrates usage of the Data Not Valid (DNV) Signal for LPDDR2-NV Memory Devices (JEDEC Standard JESD209-2F). FIG. 5 shows the timing and sequence of a read command of a LPDDR2-NV Memory device, where read data is expected with read latency (RL) of 3 cycles. FIG. 5 illustrates the case where the LPDDR2-NV memory device was unable to return data with the read latency of 3 cycles, and instead asserts the DNV signal, and returns a status via the data bus to the host memory controller that requests the memory controller to retry the read command with three different options: Immediate Retry with Read, Immediate Retry with Activate, and Retry Long with Read.

The proposed Status_n mechanism differs from the LPDDR2 DNV mechanism in that the LPDDR2 DNV mechanism applies to a memory device that has may require variable latency for some commands, whereas the proposed Status_n mechanism applies to the memory interface device which may be coupled to memory devices that may or may not require variable latency. For example, the proposed memory interface device may be coupled to commodity DRAM devices and MRAM devices that do not traditionally require variable latency commands, but the inclusion of the Status_n mechanism may be used to enable an intelligent, autonomous memory interface device where the memory interface device may dynamically utilize the coupled memory devices as needed, for autonomous data transfers or near-memory compute purposes, and in case the host memory controller attempts to access the memory devices through the memory interface device while the coupled memory devices are otherwise engaged, the memory interface device may utilize the Status_n signal to defer the request from the host memory controller, and request that the memory controller retry the command at a later time.

Example: Usage Model of the Status_n Mechanism

The Status_n mechanism can be used inform the host memory controller that data is unable to be delivered with the pre-specified latency, provide reasons for the inability to deliver that data, and provide the suggested timeframe when the command should be re-tried.

In a different scenario, the memory interface circuit 240 may perform autonomous data movements between local memory contained in the memory interface circuit and the memory devices 220, or between the local memory contained in the memory interface circuit and the memory devices 230, or between memory devices 220 and memory devices 230. In the case that the host memory controller attempts to access resources in memory devices 220 or memory devices 230 while the memory interface circuit is performing data movement operations to the same set of memory devices that the host memory controller intended to access, the memory interface circuit would be similarly prevented from returning data to the host memory controller, and through the status_n mechanism, it can also provide the reason for the delay, and provide a timeframe as to when the command should be retried.

In various embodiments, the memory buffer includes one or more additional hardware interfaces which are arranged to provide access to data stored in the DRAM chips, bypassing the host controller. In one example, the memory buffer might include a serial ATA (SATA) interface or the like such that in addition to serving as a buffer between a host controller and the DRAM, the memory buffer also serves as a buffer between the host controller and/or DRAM and external devices capable of interfacing with a SATA interface. Various example embodiments as described with reference to the accompanying drawings, in which embodiments have been shown. This inventive concept may, however, be embodied in many different forms and should not be construed as limited to the embodiments set forth herein. Rather, these embodiments are provided so that this disclosure is thorough and complete, and has fully conveyed the scope of the inventive concept to those skilled in the art. Like reference numerals refer to like elements throughout this application.

It has been understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It has be understood that when an element is referred to as being "connected" or "coupled" to another element, it can be directly connected or coupled to the other element or intervening elements may be present. In contrast, when an element is referred to as being "directly connected" or "directly coupled" to another element, there may be no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It has been be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

What is claimed is:

1. A controller to couple to a memory interface device that includes a status generator circuit, the controller comprising:
   an interface to provide a data access command and a memory address to the memory interface device; and
   a circuit to receive a status signal from the status generator circuit of the memory interface device, wherein the status signal reflects a status of the data access command being performed at the memory address and comprises an indication of a reason why the data access command was not completed within a predetermined latency period.

2. The controller of claim 1, wherein the data access command comprises a read command and wherein the circuit is further to receive data associated with the memory address when the read command is completed.

3. The controller of claim 1, wherein the status signal being asserted indicates that the memory access command was not completed within the predetermined latency period.

4. The controller of claim 1, wherein the status signal being de-asserted indicates that the memory access command was completed within the predetermined latency period.

5. The controller of claim 1, wherein the status signal comprises an indication of a time when the memory access command can be retried.

6. The controller of claim 1, wherein the interface is to couple to the memory interface device via a command bus, an address bus, and a data bus.

7. The controller of claim 6, wherein the circuit is to receive the status signal via the data bus.

8. A method of operation of a controller to couple to a memory interface device that includes a status generator circuit, the method comprising:

providing a data access command and a memory address to the memory interface device; and receiving a status signal from the status generator circuit of the memory interface device, wherein the status signal reflects a status of the data access command being performed at the memory address and comprises an indication of a reason why the data access command was not completed within a predetermined latency period.

9. The method of claim 8, wherein the data access command comprises a read command, and the method further comprising:

receiving data associated with the memory address when the read command is completed.

10. The method of claim 8, wherein the status signal being asserted indicates that the memory access command was not completed within the predetermined latency period.

11. The method of claim 8, wherein the status signal being de-asserted indicates that the memory access command was completed within the predetermined latency period.

12. The method of claim 8, wherein the status signal comprises an indication of a time when the memory access command can be retried.

13. The method of claim 8, wherein the controller is to couple to the memory interface device via a command bus, an address bus, and a data bus.

14. The method of claim 13, further comprising:
receiving the status signal via the data bus.

15. A controller to couple to a memory interface device that includes a status generator circuit, the controller comprising:

control logic configured to:

provide a data access command and a memory address to the memory interface device; and receive a status signal from the status generator circuit of the memory interface device, wherein the status signal reflects a status of the data access command being performed at the memory address and comprises an indication of a reason why the data access command was not completed within a predetermined latency period.

16. The controller of claim 15, wherein the data access command comprises a read command and wherein the circuit is further to receive data associated with the memory address when the read command is completed.

17. The controller of claim 15, wherein the status signal being asserted indicates that the memory access command was not completed within the predetermined latency period.

18. The controller of claim 15, wherein the status signal being de-asserted indicates that the memory access command was completed within the predetermined latency period.

19. The controller of claim 15, wherein the status signal comprises an indication of a time when the memory access command can be retried.

20. The controller of claim 15, wherein the controller is to couple to the memory interface device via a command bus, an address bus, and a data bus, and wherein the control logic is further configured to:

receive the status signal via the data bus.

* * * * *